US008349153B2

United States Patent
Fjeldly et al.

(10) Patent No.: US 8,349,153 B2
(45) Date of Patent: Jan. 8, 2013

(54) METHOD FOR FABRICATING A SHEET-SHAPED ELECTRODE AND A SHEET-SHAPED ELECTRODE FOR AN ELECTROSTATIC COALESCING DEVICE

(75) Inventors: Tor Fjeldly, Jar (NO); Peder Hansson, Jar (NO); Pål Jahre Nilsen, Bødalen (NO)

(73) Assignee: Hamworthy PLC, Poole (GB)

( * ) Notice: Subject to any disclaimer, the term of this patent is extended or adjusted under 35 U.S.C. 154(b) by 632 days.

(21) Appl. No.: 12/301,218

(22) PCT Filed: May 15, 2007

(86) PCT No.: PCT/IB2007/001261
§ 371 (c)(1),
(2), (4) Date: Nov. 17, 2008

(87) PCT Pub. No.: WO2007/135512
PCT Pub. Date: Nov. 29, 2007

(65) Prior Publication Data
US 2010/0000868 A1 Jan. 7, 2010

(30) Foreign Application Priority Data
May 16, 2006 (NO) .................................... 20062204

(51) Int. Cl.
*C25B 11/00* (2006.01)
*B03C 5/00* (2006.01)

(52) U.S. Cl. ................... 204/290.01; 204/573; 204/660; 204/672; 156/285; 156/382

(58) Field of Classification Search .................. 204/672, 204/290.01
See application file for complete search history.

(56) References Cited

U.S. PATENT DOCUMENTS

| 3,418,501 | A | * | 12/1968 | Felici et al. | .................. 310/309 |
| 3,649,865 | A | * | 3/1972 | Holmes | ........................ 313/350 |
| 4,235,698 | A | * | 11/1980 | Arnaud | ......................... 204/648 |
| 4,240,908 | A |   | 12/1980 | Swain et al. | |

(Continued)

FOREIGN PATENT DOCUMENTS

DE 4026802 A1 2/1992

(Continued)

OTHER PUBLICATIONS

PCT/ISA/210—International Search Report—Oct. 15, 2007.

(Continued)

*Primary Examiner* — Harry D Wilkins, III
*Assistant Examiner* — Bryan D. Ripa
(74) *Attorney, Agent, or Firm* — Venable LLP; Eric J. Franklin

(57) ABSTRACT

A method for fabricating a sheet-shaped electrode for an electrostatic coalescing device. A layered material structure including an electrically conductive layer for forming a conductive member of the electrode and two electrically non-conductive insulation layers are arranged in an envelope. The insulation layers include thermoplastic or thermoset material for forming the insulation of the electrode. The conductive layer is arranged between the insulation layers. The envelope is sealed. Gas is evacuated from the envelope. The material structure is heated to a temperature above the melting temperature of the thermoplastic material or above the curing temperature of the thermoset material so as to consolidate the material structure while keeping the material structure inside the evacuated envelope. The material structure is cooled and removed from the envelope.

25 Claims, 7 Drawing Sheets

U.S. PATENT DOCUMENTS

| | | | |
|---|---|---|---|
| 4,255,615 A | | 3/1981 | Huang et al. |
| 4,332,167 A | * | 6/1982 | Sun et al. ............. 73/304 C |
| 4,702,815 A | | 10/1987 | Prestridge et al. |
| 6,110,321 A | | 8/2000 | Day et al. |
| 6,129,829 A | | 10/2000 | Thompson |
| 6,251,497 B1 | * | 6/2001 | Hoopingarner et al. ...... 428/158 |
| 6,429,533 B1 | * | 8/2002 | Li et al. ............. 257/783 |
| 2004/0022294 A1 | | 2/2004 | Yamamori et al. |
| 2004/0051332 A1 | * | 3/2004 | Dowling ............. 296/1.01 |
| 2004/0129578 A1 | * | 7/2004 | McLachlan et al. ......... 205/742 |
| 2005/0036924 A1 | * | 2/2005 | Nilsen et al. ............. 422/186.04 |
| 2005/0227061 A1 | * | 10/2005 | Slovak et al. ............. 428/323 |

FOREIGN PATENT DOCUMENTS

| | | |
|---|---|---|
| EP | 1085632 | 3/2001 |
| GB | 1046317 | 10/1966 |
| GB | 2385009 A | 8/2003 |
| WO | WO-03049834 A1 | 6/2003 |
| WO | WO-2004/044367 A2 | 5/2004 |

OTHER PUBLICATIONS

PCT/ISA/237—Written Opinion of the International Searching Authority—Oct. 15, 2007.

* cited by examiner

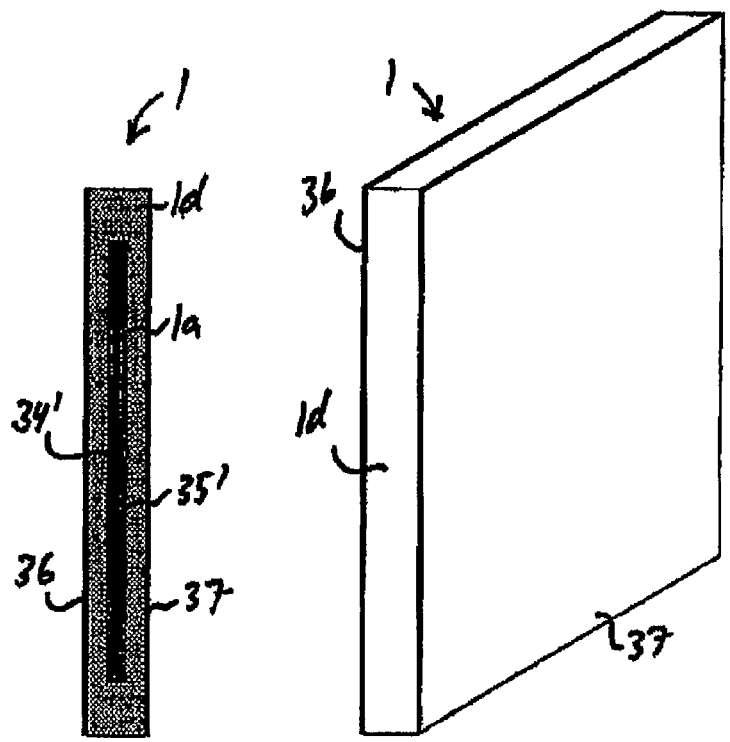
Fig 8a
Fig 8b
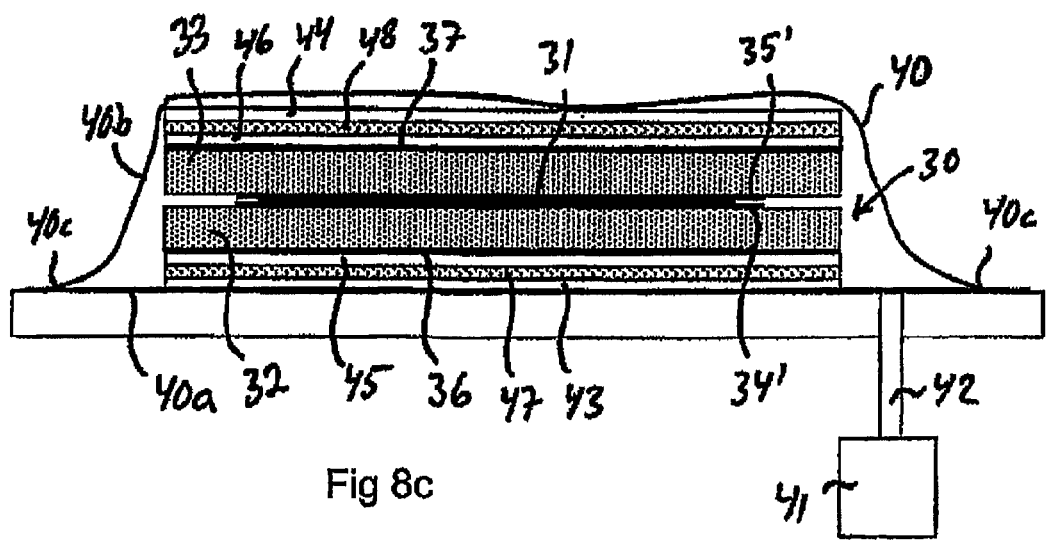
Fig 8c

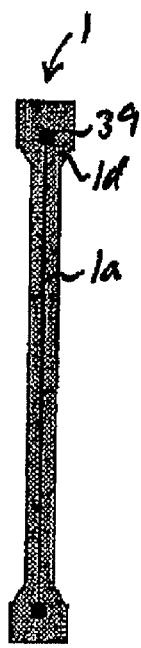
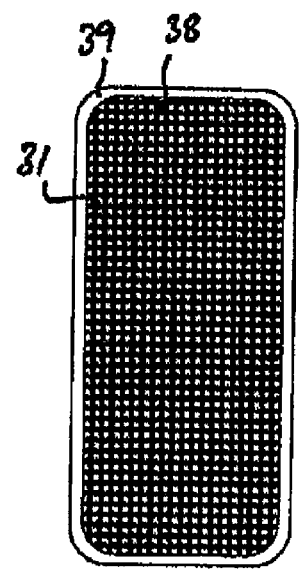
Fig 9a　　　　Fig 9b
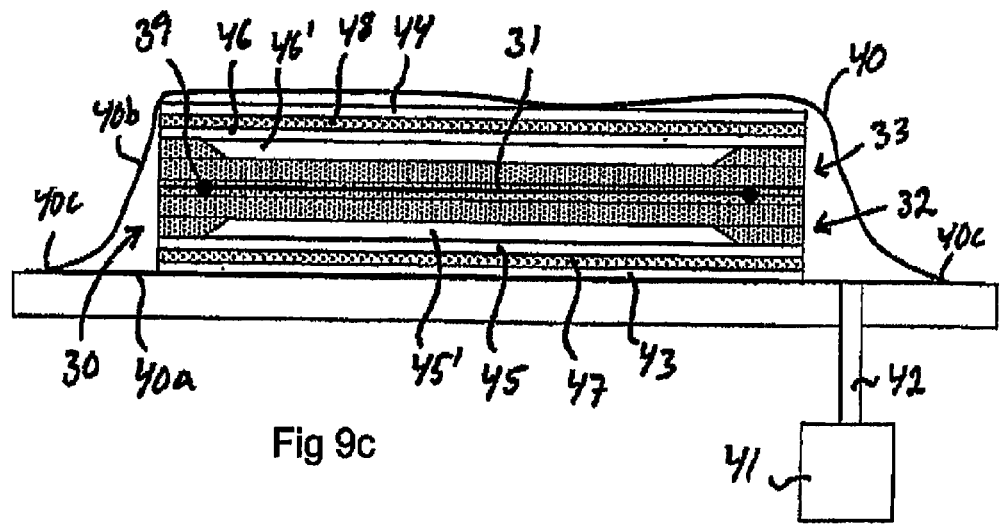
Fig 9c

METHOD FOR FABRICATING A SHEET-SHAPED ELECTRODE AND A SHEET-SHAPED ELECTRODE FOR AN ELECTROSTATIC COALESCING DEVICE

CROSS-REFERENCE TO RELATED APPLICATIONS

This application claims priority to Norwegian patent application 20062204 filed 15 May 2006 and is the national phase under 35 U.S.C. §371 of PCT/IB2007/001261 filed 15 May 2007.

FIELD OF THE INVENTION AND PRIOR ART

The present invention relates to a method for fabricating a sheet-shaped electrode for an electrostatic coalescing device, said electrode comprising a sheet-shaped conductive member of electrically conductive material at least partially enclosed by an insulation of electrically non-conductive material. The invention also relates to a sheet-shaped electrode for an electrostatic coalescing device.

The invention is particularly applicable to electrodes for electrostatic coalescing devices designed to promote the coalescence of an emulsion component in an emulsion comprising a mixture of at least two different fluid components by means of an electric field applied to the emulsion, e.g. for promoting the coalescence of water in an emulsion comprising oil and water.

In the oil and gas industry where oil is extracted from one or more wells in an oil field, oil will be extracted together with water. The water has to be removed from the oil and this is mainly done by means of settling tanks in which the oil is permitted to settle under the action of gravity. However, stable oil-water emulsions may develop during the production of the oil. For example, the use of gas-liquid cyclones might contribute to a stable emulsion that will be difficult to separate only by means of settling. After having passed through, for example, a series of gravitational settling tanks, a certain amount of water normally remains in the oil in the form of droplets. In order to promote the separation of this remaining water content, which is difficult to separate from the oil only by means of further gravitational settling, different types of coalescing devices have been proposed taking advantage of the fact that water and oil have different permittivity.

It is well known to use electrostatic coalescing devices in order to achieve water droplet enlargement or coalescence of water in water-in-oil emulsions, whereupon the water can be separated more easily from the oil, e.g. by means of gravitational separation or the like. An electrostatic coalescing device can be employed to speed up the separation of any emulsion where the continuous phase is an electrical insulator, such as oil, and the dispersed phase has a different permittivity than said continuous phase. The dispersed phase may for instance be an electrical conductor, such as water. In an electrostatic coalescing device, an emulsion is subjected to an alternating current field or to a continuous or pulsed direct current field.

WO 03/049834 A1 discloses an electrostatic coalescing device comprising several planar sheet-shaped electrodes extending in parallel with each other so as to form flow passages for an emulsion between each pair of adjacent electrodes. Different electric potentials are applied to the electrodes so as to form an electric field between each pair of adjacent electrodes, which e.g. will promote the coalescence of water contained in a water-in-oil emulsion flowing through the flow passages between the electrodes.

GB 2 385 009 A discloses an electrostatic coalescing device in the form of a so-called dielectrophoresis unit, which comprises several pairs of undulated sheet-shaped electrodes with the undulated electrodes of each pair arranged in such a manner in relation to each other that the mutual distance between the electrodes in each pair varies along the electrodes as seen in a direction perpendicular to the intended flow direction of fluid passing between the electrodes. The undulated electrodes in each pair are arranged side-by-side to define constrictive flow passage portions and widened flow passage portions. Thus, the electric field between the electrodes of each pair is inhomogeneous as seen in a cross section perpendicular to said flow direction, i.e. the field strength is different in different parts of the flow passage between the electrodes of each pair as seen in such a cross section. In inhomogeneous electric field acting on an emulsion containing emulsion components of different permittivity, dielectrophoretic forces acting on the emulsion components will be generated. In an emulsion comprising water droplets in oil, the dielectrophoretic forces will contribute to moving individual water droplets to regions having a stronger electric field than neighboring regions so as to thereby form an enhanced concentration of water droplets in these regions, which will promote the coalescence of water droplets in these regions. The water droplets have a higher permittivity than the surrounding oil and will be affected by the dielectrophoretic forces acting in the direction of the field gradient of the inhomogeneous electric field between the electrodes.

SUMMARY OF THE INVENTION

An object of the present invention is to provide a rather simple and efficient method for fabricating a sheet-shaped electrode for an electrostatic coalescing device.

According to the invention, this object is achieved by a method.

The inventive method comprises the following steps:

A) arranging in an envelope, such as a vacuum bag, a layered material structure comprising at least an electrically conductive layer for forming the conductive member of the electrode and two electrically non-conductive insulation layers, which comprise thermoplastic or thermoset material, for forming the insulation of the electrode, said conductive layer being arranged between said insulation layers;

B) sealing the envelope and thereafter evacuating gas from the envelope so as to thereby draw entrapped gas out of the material structure arranged in the envelope;

C) heating the material structure to a temperature above the melting temperature of said thermoplastic material or above the curing temperature of said thermoset material so as to consolidate the material structure while keeping it inside the evacuated envelope; and D) thereafter cooling the material structure and removing the material structure from the envelope before, during or after said cooling.

The inventive method is well suited for fabricating large-sized electrodes suitable for use in electrostatic coalescing devices of the above-indicated types.

According to a preferred embodiment of the invention, the conductive layer is provided with cavities extending through the conductive layer from one side to the other side thereof, thermoplastic or thermoset material of layers on the opposite sides of the conductive layer being made to penetrate through at least some of these cavities so as to make these opposite layers come into contact with each other and bond to each other via these cavities. Hereby, the layers on the opposite sides of the conductive layer will be bonded directly to each other at the parts thereof covering the conductive layer, which will improve the mechanical stability and the durability of the electrode. In this case, the conductive layer is suitably formed by a metal net or a perforated metal plate or a woven mat, preferably a carbon fiber mat.

According to another embodiment of the invention, the material structure arranged in the envelope in said step A comprises a corona ring, which is arranged to extend along and to be in electrical contact with the edges of the conductive layer. The electric field strength will be amplified by any sharp edge on the conductive member, which will increase the electrical stress on the insulation material in such an area. The thinner the conductive layer, the sharper the edges thereof and thereby the larger the electric field strength amplification at said edges. By smoothing the electric field at the edges of the conductive layer by means of a corona ring, the amplification of the electric field strength that may occur at the edges of the conductive layer will be counteracted. Thus, the use of a corona ring will make it possible to reduce the thickness of the conductive layer. By reducing the thickness of the conductive layer, the weight and the bulkiness of the electrode may be reduced. A reduction of the thickness of the conductive layer will also make it easier to achieve a good bonding between the layers on the opposite sides of the conductive layer when the conductive layer is provided with cavities of the above-indicated type.

According to another embodiment of the invention, the conductive layer is in said step A arranged between said insulation layers with the insulation layers extending beyond the outer edges of the conductive layer. Hereby, the insulation layers can be made to adhere to each other so as to secure a stable electrode.

Further advantages as well as advantageous features of the inventive method will appear from the following description.

The invention also relates to an electrode for en electrostatic coalescing device having the features defined in claim 24.

BRIEF DESCRIPTION OF THE DRAWINGS

With reference to the appended drawings, a specific description of preferred embodiments of the invention cited as examples follows below. In the drawings:

FIG. 8b is a schematic perspective view of the electrode of FIG. 8a, FIG. 8c is a schematic cross-sectional view of a layered material structure and equipment used for forming the electrode of FIG. 8a, FIG. 9a is a schematic cross-sectional view of an electrode fabricated by means of a method according to the present invention, FIG. 9b is a schematic planar view of a conductive layer and a corona ring used for forming the electrode of FIG. 9a, and FIG. 9c is a schematic cross-sectional view of a layered material structure and equipment used for forming the electrode of FIG. 9a.

DETAILED DESCRIPTION OF PREFERRED EMBODIMENTS OF THE INVENTION

Figure 1:
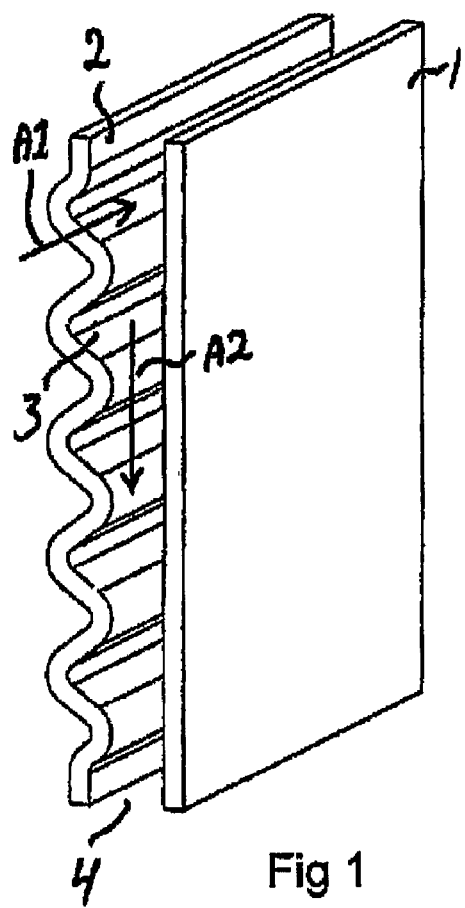
FIG. 1 is a schematic perspective view of a pair of electrodes included in an electrostatic coalescing device.
Figure 2:
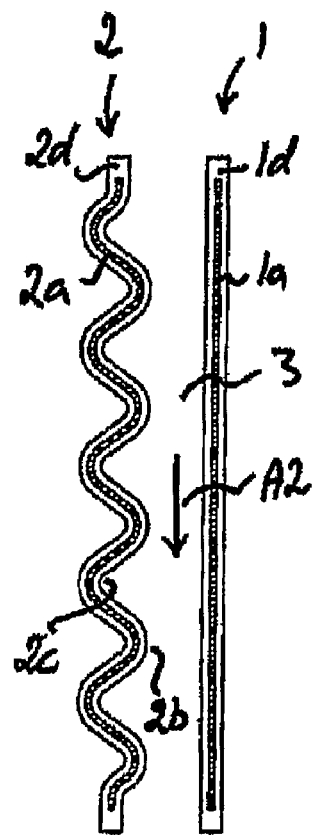
FIG. 2 is a schematic cross-sectional view of the electrodes of FIG. 1.

The inventive method is to be used for fabricating insulated electrodes 1, 2 for an electrostatic coalescing device comprising at least one pair of sheet-shaped electrodes arranged at a distance from each other side-by-side so as to form a flow passage 3 between them, as illustrated in FIGS. 1 and 2. Each electrode 1, 2 comprises a sheet-shaped conductive member 1a, 2a of electrically conductive material. In the illustrated example, the conductive member 1a of one electrode 1 of said pair is planar, whereas the conductive member 2a of the other electrode 2 of the pair is corrugated. Fluid is to flow through the flow passage 3 in the longitudinal direction of the ridges 2b and valleys 2c of the corrugated conductive member 2a. This intended flow direction is indicated by the arrow A1 in FIG. 1. Thus, the mutual distance between the conductive members 1a, 2a of the two electrodes of said pair varies along the electrodes as seen in a direction A2 perpendicular to the intended flow direction A1 of fluid passing through the flow passage 3 between the electrodes. Thus, when different electric potential is applied to the conductive members 1a, 2a of the electrodes, the electric field between the electrodes will be inhomogeneous as seen in a cross section perpendicular to said flow direction A1, i.e. as seen in the cross section illustrated in FIG. 2. Alternatively, both electrodes 1, 2 of an electrode pair could be provided with planar conductive members 1a, 2a or both electrodes 1, 2 could be provided with corrugated conductive members 1a, 2a.

The coalescing device further comprises power supply means, not shown in FIGS. 1 and 2, for applying mutually different electric potentials to the conductive members 1a, 2a of the electrodes of said pair so as to form an electric field between the electrodes 1, 2.

In the example illustrated in FIGS. 1 and 2, the planar conductive member 1a as well as the corrugated conductive member 2a is at least partially enclosed by an insulation 1d, 2d of electrically non-conductive material. In this case, the conductive members 1a, 2a may be electrically connected to different poles of a voltage source included in said power supply means. Alternatively, the conductive member of one electrode of the electrode pair may be grounded and uninsulated when the conductive member of the other electrode is connected to the voltage source and insulated.

The electrodes 1, 2 are preferably arranged to extend essentially vertically with an opening 4 extending along the lower end of the flow passage 3, i.e. between the lower edges of the electrodes 1, 2, so as to allow heavier components of an emulsion passing through the flow passage 3 between the electrodes to sink out of the flow passage 3 via this opening 4 under the action of gravity.

The voltage source included in the power supply means could be an alternating voltage source or a direct-current voltage source. The voltage source is preferably a high-voltage transformer. The high voltage is typically in the range of 1 kV to 20 kV.

Figure 3:
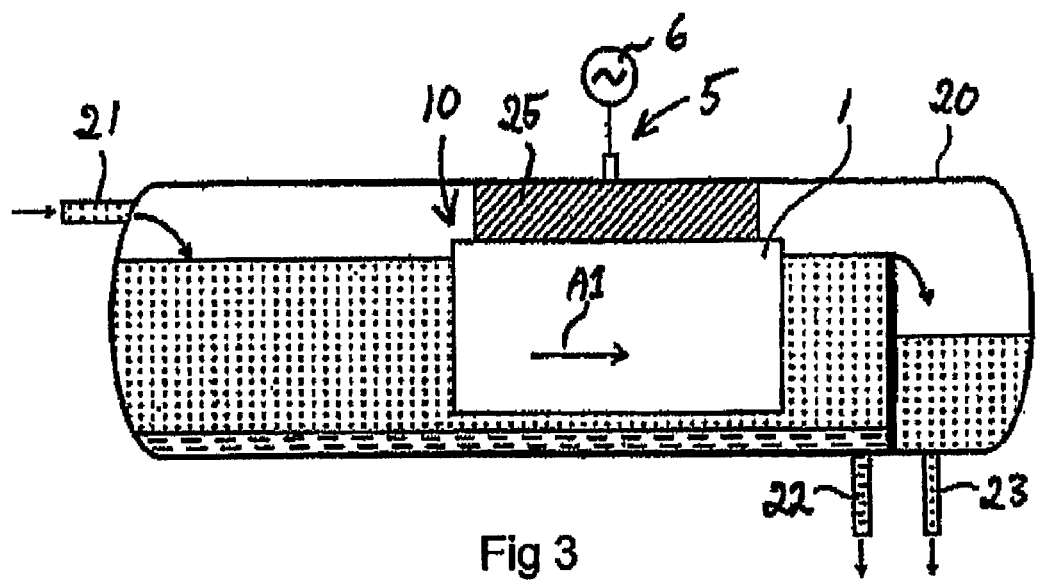
FIG. 3 is a schematic longitudinal sectional view of an electrostatic coalescing device and an associated vessel.

FIG. 3 very schematically illustrates an electrostatic coalescing device 10 provided with electrodes fabricated by means of a method according to the present invention. In the illustrated example, the coalescing device 10 is located inside a vessel 20, which is provided with an inlet 21 for receiving an emulsion to be treated by the coalescing device 10. The vessel 20 is also provided with a first outlet 22 for a first emulsion component that has been separated from the emulsion in the vessel under the action of gravity, and a second outlet 23 for a second emulsion component or the remaining emulsion from which at least a part of said first emulsion component has been separated. The coalescing device 10 comprises several pairs of electrodes of the type described with reference to FIGS. 1 and 2 arranged side-by-side so as to form a set of electrodes 1, 2 with several intermediate flow passages 3. In the illustrated example, every second electrode 1 of said set comprises a planar conductive member 1a and every second electrode 2 comprises a corrugated conductive member 2a. Alternatively, all electrodes 1, 2 could be provided with planar conductive members 1a, 2a or all electrodes 1, 2 could be provided with corrugated conductive members 1a, 2a. The coalescing device 10 also comprises power supply means 5 including a voltage source 6 for applying mutually different electric potentials to the conductive members 1a, 2a of the electrodes of said set so as to form an electric field between each pair of adjacent electrodes 1, 2. The corrugated conductive members 2a are so arranged that the ridges 2b and valleys 2c thereof extend in a direction A1 corresponding to the normal flow direction for the emulsion received in the vessel 20. The electrodes 1, 2 are vertically arranged and are suspended by a holder 25 secured at the upper part of the vessel.

Figure 4:
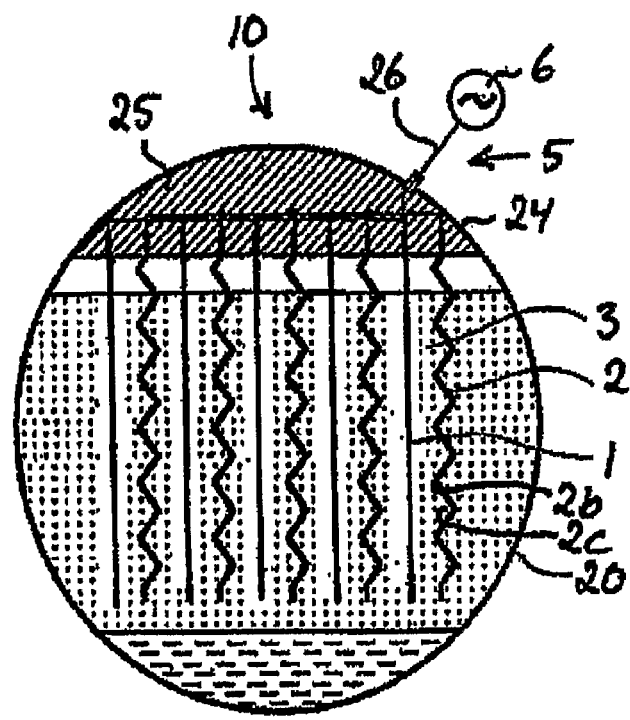
FIG. 4 is a schematic cross-sectional view of the coalescing device and the vessel of FIG. 3.

In the embodiment illustrated in FIG. 4, the conductive member 1a of every second electrode 1 is electrically connected to the voltage source 6 of the power supply means 5 via a connection 26 and the conductive member 2a of every second electrode 2 is grounded. In this case, each one of the conductive members 1a connected to the voltage source 6 is at least partially enclosed by an insulation of electrically non-conductive material, whereas each one of the grounded conductive members 2a may be uninsulated. In the illustrated example, the conductive members 2a are grounded by being electrically connected to the outer wall 24 of the vessel 20.

Figure 5:
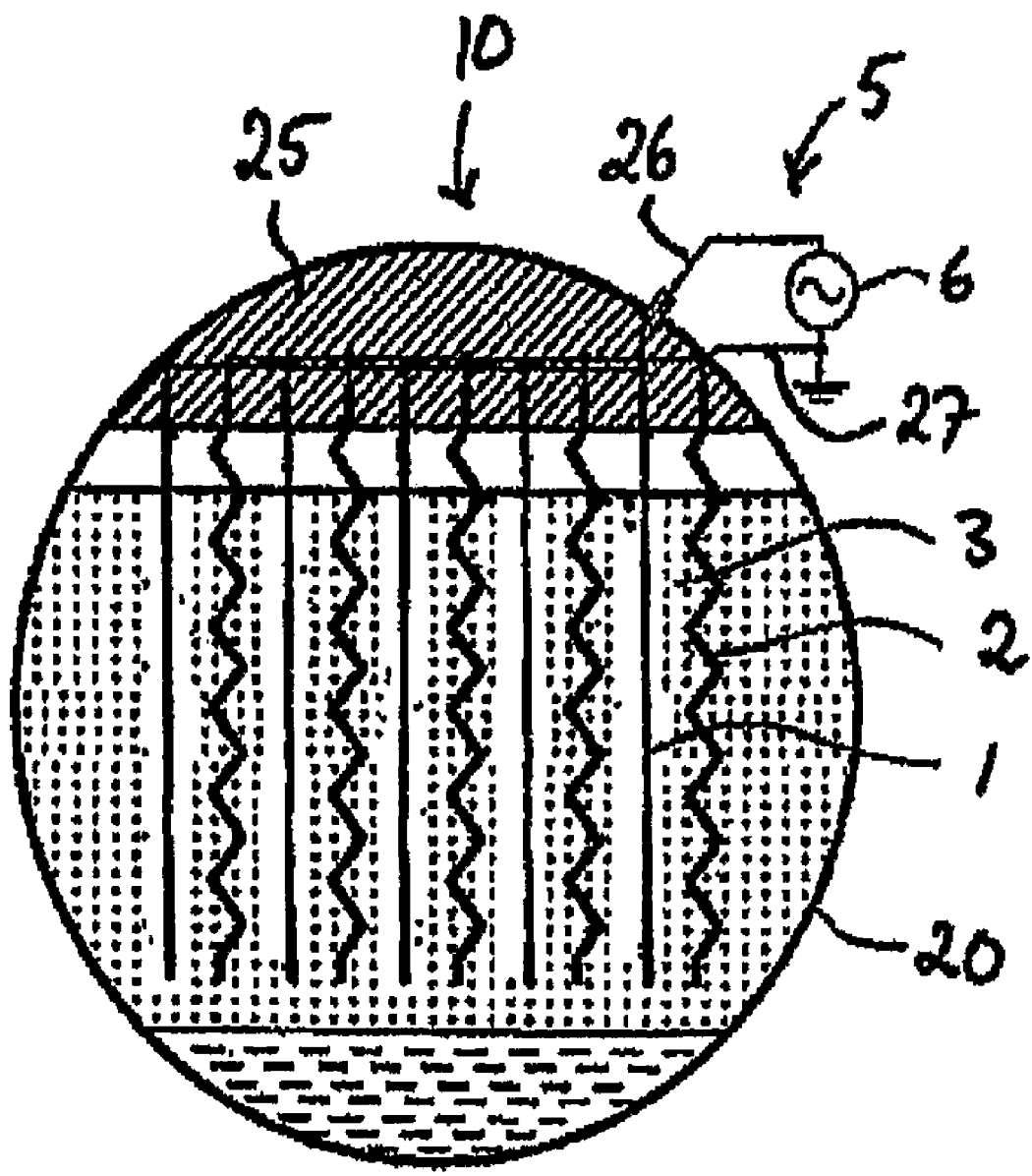
FIG. 5 is a schematic cross-sectional view of another electrostatic coalescing device and an associated vessel.

In the embodiment illustrated in FIG. 5, the conductive members 1a, 2a of all electrodes are electrically connected to the voltage source 6 of the power supply means 5. The conductive member 1a of every second electrode 1 is electrically connected to a first pole of the voltage source 6 via a first connection 26 and the conductive member 2a of every second electrode 2 is connected to another pole of the voltage source 6 via a second connection 27. Preferably, each one of the conductive members 1a, 2a is at least partially enclosed by an insulation of electrically non-conductive material in this case.

In the examples illustrated in FIGS. 3-5, the vessel 20 is a gravity settling tank. However, a coalescing device provided with electrodes fabricated by means of a method according to the present invention is of course not limited to the use in such a settling tank. The coalescing device could for instance be located in a tube, a pipeline or the like.

The coalescing device 10 may with advantage comprise several electrode sets of the above-indicated type. The electrodes 1, 2 of each set are preferably pre-assembled to form a separate electrode module. Each electrode set/module may be provided with its own power supply. Two or more of these sets/modules may be arranged at the side of each other so as to form a row of two or more electrode sets/modules and/or two or more of these sets/modules may be arranged above each other so as to form a column of two or more electrode sets/modules.

In the following, the inventive method will be described, with reference to FIGS. 6-9, as used for fabricating an electrode comprising a sheet-shaped conductive member that is planar. However, the inventive method may also be used for fabricating an electrode comprising a sheet-shaped conductive member that is corrugated. A corrugated conductive member here refers to a conductive member having a surface provided with alternating ridges and valleys extending along the surface. The ridges and valleys of the corrugated conductive member could be wave-like, as illustrated in FIGS. 1 and 2, or designed with sharp edges at the crests of the ridges and at the bottom of the valleys, as illustrated in FIGS. 4 and 5. The corrugated conductive member could for instance be folded, crinkled, wrinkled or undulated and could for instance have an undulated profile as illustrated in FIGS. 1 and 2 or a saw-tooth shaped profile as illustrated in FIGS. 4 and 5.

According to the invention, the electrode 1 is formed by a layered material structure 30 comprising at least an electrically conductive layer 31 for forming the conductive member of the electrode and two electrically non-conductive insulation layers 32, 33 for forming the insulation of the electrode. The conductive layer 31 is for instance of aluminium, copper, steel or any other suitable metal. The insulation layers 32, 33 comprise thermoplastic or thermoset material. Preferably, the base or matrix of the insulation layers is of thermoplastic or thermoset material. The respective insulation layer 32, 33 may be formed by two or more superposed sheets of electrically non-conductive material. The insulation layers 32, 33 are with advantage formed by prepreg. The conductive layer 31 is arranged between said insulation layers 32, 33, preferably with the insulation layers extending beyond the outer edges 31a-31d of the conductive layer.

Said thermoplastic or thermoset material is with advantage a fluoropolymer or an epoxy with hardener.

The layered material structure 30 is arranged in an envelope 40, preferably in the form of a vacuum bag, and the envelope is sealed. Thereafter, gas is evacuated from the envelope 40 by means of a vacuum pump 41 connected to the inner volume of the envelope via a conduit 42 so as to thereby draw entrapped gas, such as air, out of the material structure 30 arranged in the envelope 40. The material structure 30 is then heated to a temperature above the melting temperature of said thermoplastic material or above the curing temperature of said thermoset material so as to consolidate the material structure 30 while keeping it inside the evacuated envelope 40. Hereby, the insulation layers 32, 33 will bond to each other and to the conductive layer 31 or to any other layer arranged between the conductive layer and the respective insulation layer. Thereafter, the material structure 30 with its mutually bonded layers is cooled. The material structure 30, i.e. the thus formed electrode 1, may be removed from the envelope 40 before, during or after said cooling. Preferably, the material structure 30 is kept in the evacuated envelope 40 at least during the initial phase of the cooling.

The envelope 40 may for instance be formed of flexible sheets 40a, 40b of a material impermeable to gas. In the examples illustrated in FIGS. 6c, 8c and 9c, the envelope 40 is formed of a first flexible sheet 40a arranged below the material structure 30 and a second flexible sheet 40b arranged above the material structure 30. These two sheets 40a, 40b are then bonded to each other in any suitable manner so as to form gas-tight joints 40c between the sheets.

The material structure 30 may be heated by placing the evacuated envelope 40 with the material structure arranged therein in a heating chamber. As an alternative to or in combination with heating in a heating chamber, the material structure 30 may be heated by means of one or more heating elements 43, 44, e.g. plate-shaped electrical heating elements, arranged in the envelope 40 before the sealing of the envelope. Such heating elements 43, 44 are preferably arranged on opposite sides of the material structure 30.

Pressing plates 45, 46 are suitably arranged in the envelope 40 on opposite sides of the material structure 30 before the sealing of the envelope. These pressing plates are to cover the two opposite main sides of the material structure 30 so as to secure a uniform distribution of oppositely directed pressing forces over these sides of the material structure. The pressing plates are suitably of steel or any other suitable metal. When heating elements 43, 44 are arranged in the envelope 40, the pressing plates 45, 46 are to be arranged between the heating elements 43, 44 and the material structure 30. The pressing plates are shaped so as to conform to the desired shape of the electrode to be fabricated. Thus, the pressing plates 45, 46 also function as moulding plates and corrugated pressing plates may be used for forming a corrugated electrode of the type described above with reference to FIGS. 1 and 2. If so desired, several planar pressing plates of different sizes may be arranged superposed on one and the same side of the material structure 30 so as to give this side of the electrode to be formed a desired shape.

The heated material structure 30 may be subjected to consolidation pressure while keeping the material structure inside the evacuated envelope 40. The required consolidation pressure is preferably achieved by means of overpressure acting on the outside of the evacuated envelope 40. The required consolidation pressure may alternatively be achieved by placing the envelope 40 and the material structure 30 in a pressure chamber or an autoclave, or between mechanical pressing members.

Porous material layers 47, 48 are with advantage arranged in the envelope 40 on opposite sides of the material structure 30, preferably between the outermost pressing plate 45, 46 on the respective side of the material structure and the envelope 40, so as to allow gas to flow through the porous material layers 47, 48 during the evacuation of gas from the envelope 40.

Different examples of electrodes 1 fabricated by means of a method according to the present invention for use in an electrostatic coalescing device will be described in the following.

A layer of semiconducting material is with advantage arranged between the conductive member 1a and the associated insulation 1d on at least one side of the conductive member, preferably on both sides thereof, surface-to-surface with the conductive member. Each one of said layers 34, 34', 35, 35' of semiconducting material is suitably arranged to overlap one or several edges of the conductive member 1a, as illustrated in FIGS. 6a, 7a and 8a, so as to smooth the electric field at said edge or edges.

Figure 6A:
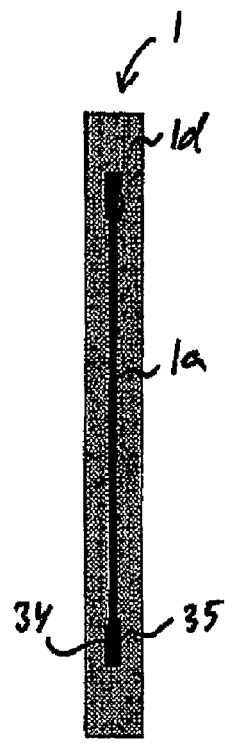
FIG. 6a is a schematic cross-sectional view of an electrode fabricated by means of a method according to the present invention.
Figure 6B:
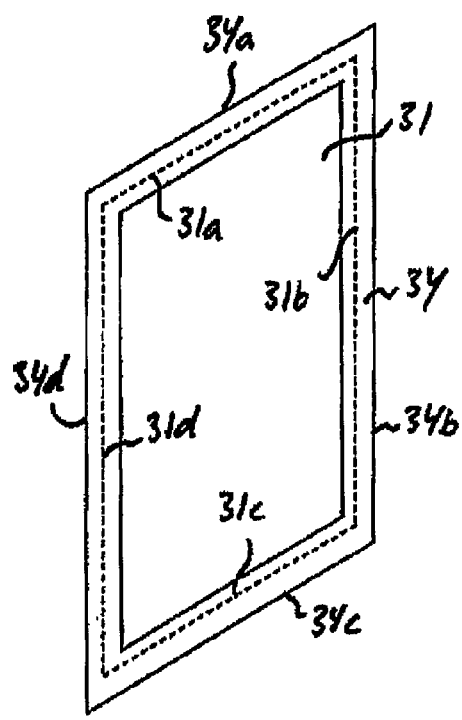
FIG. 6b is a schematic perspective view of a semiconducting layer used for forming the electrode of FIG. 6a, FIG. 6c is a schematic cross-sectional view of a layered material structure and equipment used for forming the electrode of FIG. 6a, FIG. 7a is a schematic cross-sectional view of an electrode fabricated by means of a method according to the present invention.
Figure 6C:
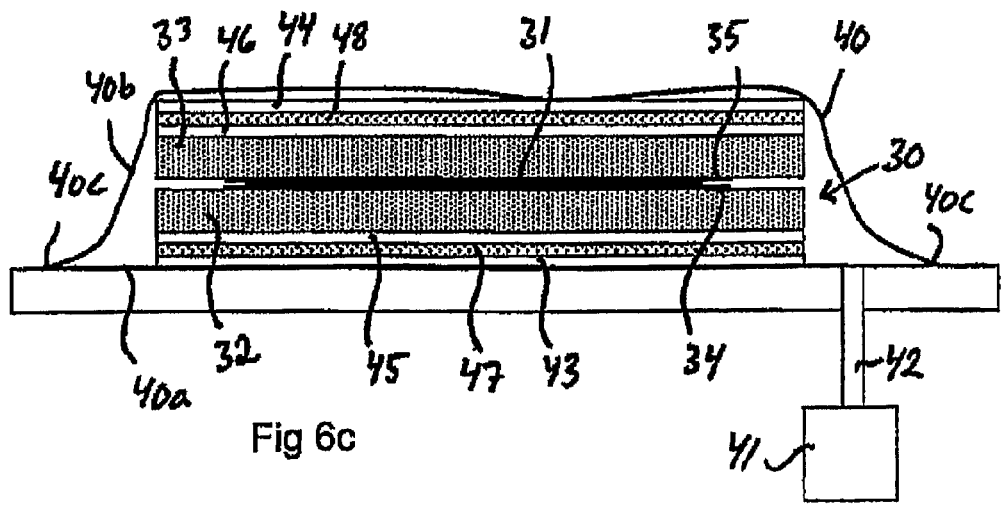

In the example illustrated in FIG. 6a-6c, each one of said layers 34, 35 of semiconducting material is shaped as a frame that overlaps all the outer edges 31a-31d of the conductive layer 31. In the illustrated example, the conductive layer 31 is planar and rectangular and the outer edges 31a-31d thereof are indicated by broken lines in FIG. 6b. The insulation 1d of the electrode 1 is formed by two insulation layers 32, 33 arranged on opposite sides of the conductive layer 31. In this case, the respective layer 34, 35 of semiconducting material is arranged between the conductive layer 31 and one of said insulation layers 32, 33, as illustrated in FIG. 6c, which shows the different layers of the material structure 30 used for forming the electrode 1 of FIG. 6a arranged in a vacuum bag 40. In the illustrated example, the insulation layers 32, 33 are arranged to overlap the outer edges 34a-34d of the intermediate layers 34, 35 of semiconducting material and the outer edges 31a-31d of the intermediate conductive layer 31.

Figure 7A:
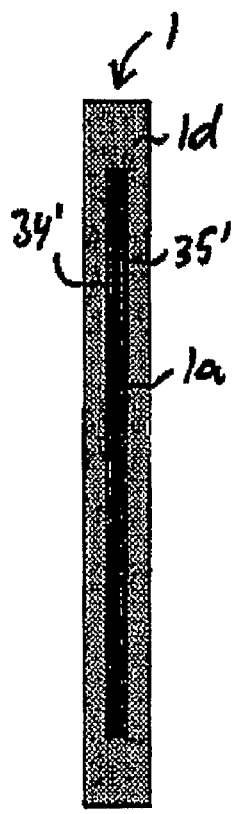
FIG. 7b is a schematic perspective view of a semiconducting layer used for forming the electrode of FIG. 7a, FIG. 8a is a schematic cross-sectional view of an electrode fabricated by means of a method according to the present invention.
Figure 7B:
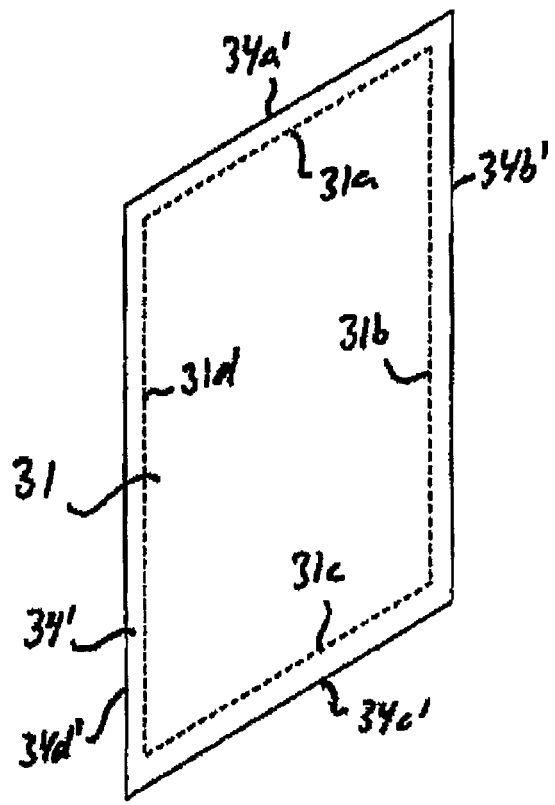

In the example illustrated in FIGS. 7a and 7b, each one of said layers 34', 35' of semiconducting material is shaped as a continuous sheet that completely covers the associated side of the conductive member 1a and overlaps all the outer edges thereof. In the illustrated example, the conductive layer 31 is planar and rectangular and the outer edges 31a-31d thereof are indicated by broken lines in FIG. 7b. The insulation 1d of the electrode 1 is formed by two insulation layers 32, 33 arranged on opposite sides of the conductive layer 31. In this case, the respective layer 34', 35' of semiconducting material is arranged between the conductive layer 31 and one of said insulation layers 32, 33, in the manner illustrated in FIG. 6c.

Each one of said layers 34, 34', 35, 35' of semiconducting material is preferably arranged surface-to-surface with the conductive member 1a and surface-to-surface with the insulation 1d, i.e. surface-to-surface with the associated insulation layer 32, 33, in order to prevent partial discharges in the associated area between the conductive member 1a and the insulation 1d.

In the example illustrated in FIG. 8a-8c, the insulation 1d of the electrode 1 is covered by layers 36, 37 of semiconducting material arranged surface-to-surface with the insulation 1d on the opposite sides thereof. These layers 36, 37 are arranged to cover the sides of the insulation 1d facing an adjacent electrode 2 of the coalescing device 10. In the illustrated example, the external layers 36, 37 of semiconducting material are arranged to completely cover these sides of the insulation 1d. The insulation 1d of the electrode 1 is formed by two insulation layers 32, 33 arranged on opposite sides of the conductive layer 31. In this case, the respective external layer 36, 37 of semiconducting material is arranged on the outwardly facing surface of one of said insulation layers 32, 33, as illustrated in FIG. 8c, which shows the different layers of the material structure 30 used for forming the electrode 1 of FIG. 8a arranged in a vacuum bag 40. In the illustrated example, the electrode 1 is also provided with layers 34', 35' of semiconducting material arranged between the conductive member 1a and the insulation 1d as described above with reference to FIGS. 7a and 7b.

The above-indicated layers 34, 34', 35, 35', 36, 37 of semiconducting material suitably comprise a base or a matrix at least partially formed of the same thermoplastic or thermoset material that is included in the insulation layers 32, 33. This is favorable with respect to the bonding between these semiconducting layers and the insulation layers.

The conductive layer 31 is suitably provided with cavities 38 (see FIG. 9b) extending through the conductive layer from one side to the other side thereof so as to allow thermoplastic or thermoset material of layers on the opposite sides of the conductive layer 31 to penetrate through at least some of these cavities 38 so as to make these opposite layers come into contact with each other and bond to each other via these cavities. In this case, the conductive layer 31 may be formed by a metal net or a perforated metal plate or a woven mat, preferably a carbon fiber mat.

A corona ring 39 is with advantage arranged to extend along and in electrical contact with the edges of the conductive layer 31, as illustrated in FIGS. 9a-9c. The insulation 1d may be thinner at the central parts of the electrode 1 and thicker in the vicinity of the corona ring 39, as illustrated in FIG. 9a.

FIG. 9c shows the different layers of the material structure 30 used for forming the electrode 1 of FIG. 9a arranged in a vacuum bag 40. In the illustrated example, an additional pressing plate 45', 46' is arranged on the inwardly facing surface of the respective outermost pressing plate 45, 46 in order to give the electrode 1a thinner insulation at the central parts. The respective insulation layer 32, 33 is here formed by several superposed sheets of electrically non-conductive material.

The invention is of course not in any way restricted to the embodiments described above. On the contrary, many possibilities to modifications thereof will be apparent to a person with ordinary skill in the art without departing from the basic idea of the invention such as defined in the appended claims.

What is claimed is:

1. A method for fabricating a sheet-shaped electrode for an electrostatic coalescing device, said electrode comprising a sheet-shaped conductive member of electrically conductive material at least partially enclosed by an insulation of electrically non-conductive material, the method comprising:
   arranging in an envelope, a layered material structure comprising at least an electrically conductive layer for forming the conductive member of the electrode and two electrically non-conductive insulation layers, which comprise thermoplastic or thermoset material, for forming the insulation of the electrode, said conductive layer being arranged between said insulation layers;
   sealing the envelope and thereafter evacuating gas from the envelope so as to thereby draw entrapped gas out of the material structure arranged in the envelope;
   heating the material structure to a temperature above the melting temperature of said thermoplastic material or above a curing temperature of said thermoset material so as to consolidate the material structure while keeping it inside the evacuated envelope; and
   cooling the material structure and removing the material structure from the envelope before, during or after said cooling to form the a sheet-shaped electrode for an electrostatic coalescing device and comprising a sheet-shaped conductive member of electrically conductive material at least partially enclosed by an insulation of electrically non-conductive material,
   wherein the material structure arranged in the envelope comprises a semiconducting layer arranged on at least one side of the material structure surface-to-surface with the outwardly facing surface of the associated insulation layer.

2. The method according to claim 1, wherein the conductive layer is provided with cavities extending through the conductive layer from one side to the other side thereof, thermoplastic or thermoset material of layers on the opposite sides of the conductive layer being made to penetrate through at least some of these cavities so as to make these opposite layers come into contact with each other and bond to each other via these cavities.

3. The method according to claim 2, wherein the conductive layer comprises a metal net or a perforated metal plate or a woven mat.

4. The method according to claim 1, wherein the material structure arranged in the envelope comprises a corona ring, which is arranged to extend along and to be in electrical contact with the edges of the conductive layer.

5. The method according to claim 1, wherein a base or matrix of the insulation layers comprises thermoplastic or thermoset material.

6. The method according to claim 1, wherein the conductive layer is arranged between said insulation layers with the insulation layers extending beyond the outer edges of the conductive layer.

7. The method according to claim 1, wherein heating the material structure to a temperature above the melting temperature of said thermoplastic material or above a curing temperature of said thermoset material comprises placing the evacuated envelope with the material structure arranged therein in a heating chamber.

8. The method according to claim 1, wherein at least one plate-shaped electrical heating element is arranged in the envelope on at least one side of the material structure, the material structure being heated with the heating element.

9. The method according to claim 8, wherein a plurality of heating elements are arranged in the envelope on opposite sides of the material structure, wherein the material structure is heated by the heating elements.

10. The method according to claim 1, wherein pressing plates are arranged in the envelope on opposite sides of the material structure.

11. The method according to claim 1, wherein porous material layers are arranged in the envelope on opposite sides of the material structure so as to allow gas to flow through the porous material layers during the evacuation of gas from the envelope.

12. The method according to claim 1, wherein the heated material structure is subjected to consolidation pressure while keeping the material structure inside the evacuated envelope.

13. The method according to claim 12, wherein the consolidation pressure is achieved by overpressure acting on the outside of the evacuated envelope.

14. The method according to claim 12, wherein the consolidation pressure is achieved by a pressure chamber or an autoclave, in which the envelop with the material structure arranged therein is placed.

15. The method according to claim 12, wherein the consolidation pressure is achieved by mechanical pressing members.

16. The method according to claim 1, wherein the material structure arranged in the envelope comprises a semiconducting layer arranged on at least one side of the conductive layer surface-to-surface with the conductive layer.

17. The method according to claim 16, wherein the respective semiconducting layer comprises a base or a matrix at least partially formed of the thermoplastic or thermoset material that is included in the insulation layers.

18. The method according to claim 1, wherein the material structure is kept in the evacuated envelope at least during the initial phase of the cooling.

19. The method according to claim 1, wherein the respective insulation layer comprise two or more superposed sheets of electrically non-conductive material.

20. The method according to claim 1, wherein the insulation layers comprise prepreg.

21. The method according to claim 1, wherein said thermoset material comprises an epoxy with hardener.

22. The method according to claim 1, wherein said thermoplastic material comprises a fluoropolymer.

23. A sheet-shaped electrode for an electrostatic coalescing device, said electrode comprising:

a sheet-shaped conductive member for an electrostatic coalescing device, the sheet-shaped electrode comprising electrically conductive material, the conductive member comprising cavities extending through the conductive member from one side to the other side thereof, thermoplastic or thermoset material of material layers on opposite sides of the conductive member penetrating through at least some of these cavities such that the opposite layers are in contact with each other and bond to each other via these cavities;

insulation comprising electrically non-conductive material at least partially enclosing the conductive member; and a semiconducting layer arranged on at least one side of the conductive member surface-to-surface with an outwardly facing surface of an associated insulation layer.

24. The sheet-shaped electrode according to claim 23, wherein the conductive member comprises a metal net or a perforated metal plate or a woven mat.

25. The sheet-shaped electrode according to claim 23, wherein the electrode further comprises a corona ring, which extends along and is in electrical contact with the edges of the conductive member.

* * * * *